March 30, 1965 C. R. FISHER, JR 3,176,280

DATA HANDLING SYSTEM

Original Filed Jan. 18, 1957 2 Sheets-Sheet 1

INVENTOR
CHARLES R. FISHER JR by F. H. Henson
ATTORNEY.

March 30, 1965 C. R. FISHER, JR 3,176,280

DATA HANDLING SYSTEM

Original Filed Jan. 18, 1957 2 Sheets-Sheet 2

United States Patent Office 3,176,280
Patented Mar. 30, 1965

3,176,280
DATA HANDLING SYSTEM

Charles R. Fisher, Jr., Pittsford, N.Y., assignor to General Dynamics Corporation, Rochester, N.Y., a corporation of Delaware Original application Jan. 18, 1957, Ser. No. 634,973, now Patent No. 2,976,347, dated Mar. 21, 1961. Divided and this application July 28, 1960, Ser. No. 45,907
7 Claims. (Cl. 340—174.1)

Figures 1, 3:
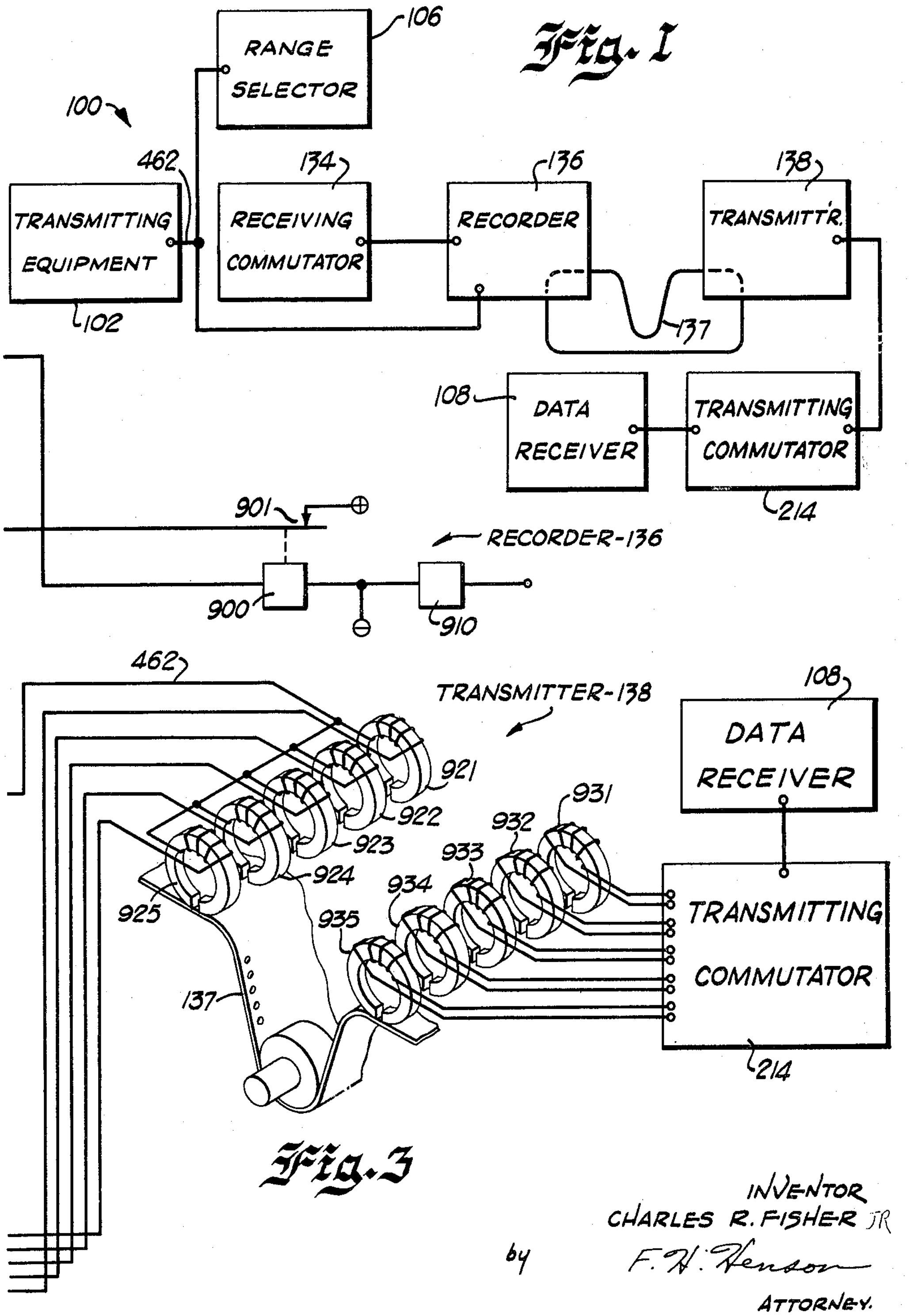

This invention relates to a data handling system and, more particularly, to a system for recording data on a magnetic member. The present application is a division of a copending application of Charles R. Fischer et al., Serial No. 634,973, filed January 18, 1957, now Patent No. 2,976,347, dated March 21, 1961.

In existing data relaying and handling systems of the type used in a telegraph network, lengths of a record element, such as a paper tape, are used in reperforating equipment to provide intermediate data storage at switching points or between data originating and terminating offices. The use of an expendable storage medium, such as a perforated tape, is somewhat costly from the viewpoints of material cost and handling time and usually requires the provision of an essentially mechanical mechanism, such as a perforator. Because of the high operating speeds utilized, these mechanical components require precision construction, are difficult to maintain without skilled personnel, and involve a rather large capital expenditure. In addition, it often is not possible to fully realize either the high speed operation or the reduction of the installation space afforded by electronic techniques when mechanical links are interposed in the system.

Accordingly, one object of the present invention is to provide a new and improved data handling system.

Another object is to provide a data handling system including a reuseable storage medium.

Another object is the provision of a system of the type described above having new and improved data recording means.

A further object is to provide new and improved means for recording coded data on a magnetic member.

Another object is to provide a magnetic recording means in which a plurality of recording heads disposed adjacent different channels of the magnetic member are rendered effective in sequence to record data bits serially received from a signaling line.

Another object is to provide a magnetic recording means including a plurality of recording heads supplied both with a common signal potential of varying level and with individual gating signals.

Another object is to provide a magnetic recording means including new and improved means for advancing a magnetic member through successive increments of movement following the recording of each of a series of groups of code bits.

In accordance with these and many other objects, an embodiment of the invention comprises a plurality of magnetic recording or transducing heads that are disposed adjacent transversely spaced portions of a magnetic member to provide a plurality of different channels thereon. The number of recording heads provided is equal to the number of bits in a selected combinational or permutation code, such as a Baudot code, and one side of the winding in each of these recording heads is connected to a common signaling conductor to which successive mark and space bits of the code are sequentially applied in the form of a selected one of two steady state potentials. The other terminals of the windings on the transducing heads are individually connected to gating means controlled by a plurality of electronic devices in a counting chain.

When an incoming signal is applied to the data recording circuit or receiving commutator, all of the windings are energized in parallel by the signaling potential applied to the common signaling lead, and the counting circuit is placed in operation. As each of the electronic devices or counting stages in the counting circuit is operated, the related gating means connected to the other terminals of the windings on the recording heads are sequentially supplied with enabling potentials. If the potential on the common signaling conductor is at one level, the gating means then enabled by the counting circuit is opened to permit a current flow through the winding to record a code bit on the magnetic member. Alternatively, if the potential on the common signaling conductor is at its alternate level, the gating means enabled by the operated one of the stages in the counting circuit is not opened, and current does not flow through the window of the recording head so that a code bit is not recorded in the related channel on the magnetic member. At the completion of one cycle of operation, the counting circuit supplies an operating signal to a drive mechanism which advances the magnetic member a single step. This conditions the magnetic member for receiving the next code combination.

Figure 2:
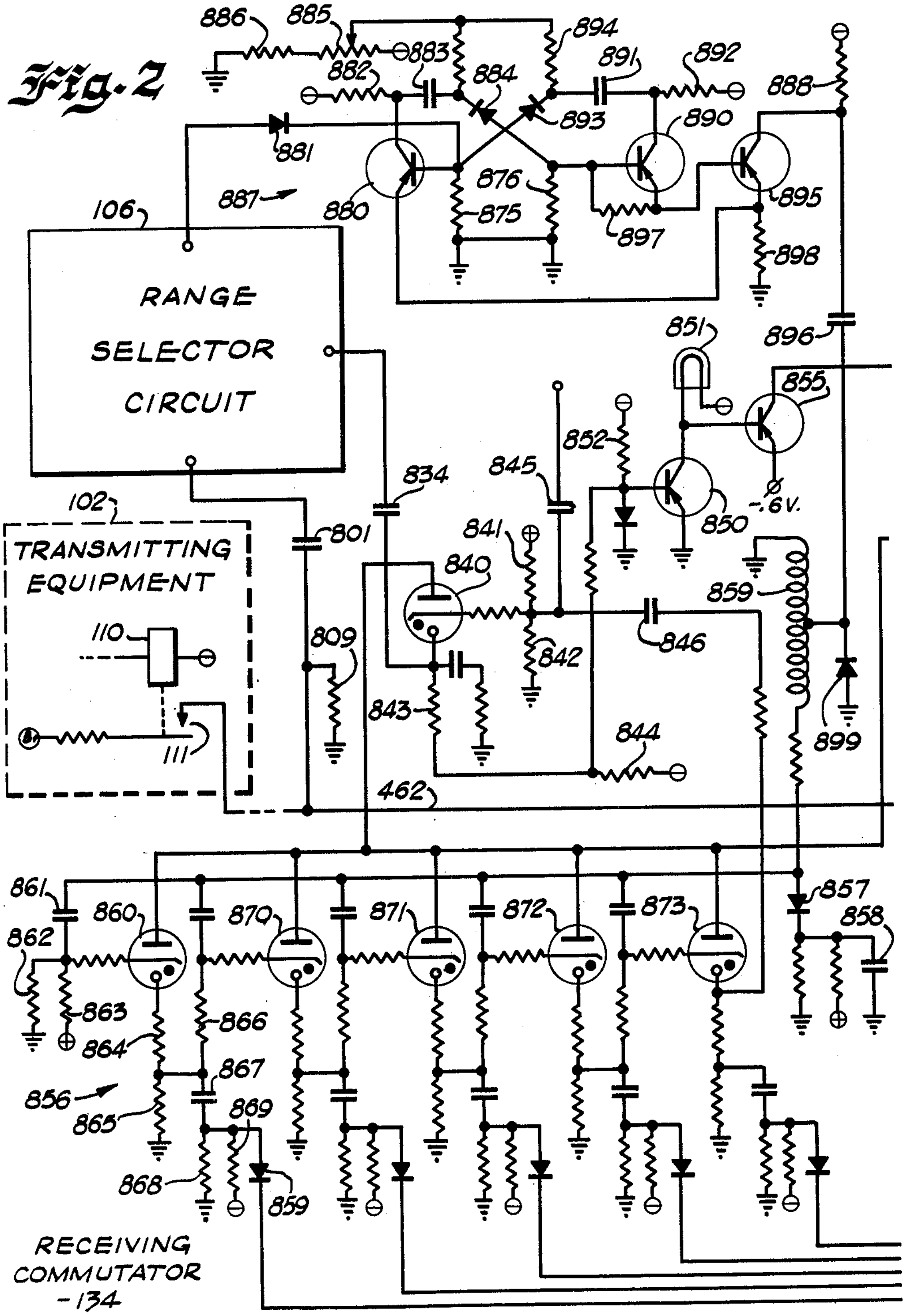

Many other objects and advantages of the present invention will become apparent from considering the following detailed description in conjunction with the drawings in which:

FIG. 1 is a block diagram of a data handling system embodying the present invention; and FIGS. 2 and 3, when placed adjacent each other, form a schematic circuit diagram of a data recording means included in the system shown in FIG. 1.

Referring now more specifically to FIG. 1 of the drawings, therein is shown a data handling system 100 which embodies the present invention and which can comprise a telegraph switching system of the type described in detail in the above identified copending Fisher et al. application. To illustrate the relationship between the circuits shown in this application and in the Fisher et al. application, the reference numbers used in these two applications have been made the same whenever possible. In general, the system 100 comprises transmitting equipment 102 that supplies signals in a combination or permutation code, such as a Baudot code, over a common signaling line 462 for recording on a magnetic member 137 by a recorder 136 under the control of a range selector circuit 106 and a receiving commutator 134. The incoming data, which is recorded on the magnet member 137 as longitudinally spaced transverse code groups by the recorder 136, is reproduced by a transmitter 138 in parallel form and is converted to a serially transmitted form by a transmitting commutator 214. The serially transmitted bits of the reproduced code groups are supplied from the transmitting commutator 214 to a data receiver 108. Suitable magnetic erasing means can be provided in either the recorder 136 or the transmitter 138 to erase transmitted code groups from the magnetic member 137.

Each of the data items or code groups serially supplied to the common signaling line 462 by the transmitting equipment 102 comprises five mark or space information bits preceded by a start pulse and followed by a start pulse. The recorder 136 includes five recording or magnetic transducing heads disposed adjacent five transversely spaced portions of the magnetic member 137 for recording the five information bits as a parallel entry on the magnetic member 137. One side of each of the windings on the transducing heads is connected to the common signaling line 462, and the other sides of the windings on these five heads are individually connected through five gating means to five electronic devices in a counting chain in the receiving commutator 134.

When the start pulse preceding each code combination is applied to the line 462 by the transmitting equipment 102, the range selector 106 initiates the operation of a multivibrator in the receiving commutator 134. When the multivibrator is placed in operation, the five electronic devices in the counting chain are rendered conductive in sequence so that the five gate circuits connected to the five recording heads in the recorder 136 are enabled in sequence. Since the other sides of the five recording heads are connected in common to the signaling path, the gating means permit the flow of current through the connected windings of the recording heads in accordance with the level of the potential on the line 462 representing a mark or space condition. When the last electronic device in the counting circuit is fired, the operation of the multivibrator is terminated, and a drive means in the recorder 136 is operated to advance the magnetic member 137 a single step. In this manner, the first received code combination is recorded on the magnetic member 137, and this member is advanced a single step to condition it for receiving and storing the next code combination.

The transmitter 138 comprises five reproducing or magnetic transducing heads disposed adjacent the five transversely spaced channels on the magnetic member 137. These heads reproduce the signals recorded on the member 137 by the recorder 136 and store the reproduced signals in five bistable circuits in the transmitting commutator 134. Each of the bistable circuits is controlled by one of the transducing heads in the transmitter 138 to store a mark or space signal in accordance with the presence or absence of a signal in the related channel on the magnetic member 137. To provide means for converting the static mark and space signals stored in the bistable circuits into serially transmitted output signals, the transmitting commutator 214 includes a counting chain driven by a continuously operated multivibrator. The counting chain pulses a plurality of neon diode gates that are selectively enabled by the bistable circuits so as to provide mark and space pulses that are sequentially transmitted to the data receiver 108. The transmitting commutator 214 also includes a plurality of neon diode gating circuits for recognizing certain predetermined code combinations in the signals reproduced by the transmitter 138. These gating circuits or detecting means are used to control the performance of certain auxiliary functions by the data handling system 100.

The recorder 136 and the transmitter 138 (FIG. 3) can comprise any suitable magnetic data handling apparatus, such as one utilizing a magnetic drum or tape as a storage element. However, the recorder 136 and the transmitter 138 preferably comprise an apparatus of the type shown and described in detail in the above identified Fisher et al. application. As shown therein, the magnetic member 137 comprises an endless length or closed loop of a flexible magnetic film having a longitudinally extending row of sprocket holes adjacent each of its edges. To record the five information bits or mark and space signals forming each Baudot code combination, the recorder 136 includes five transducing heads 921–925 that are disposed adjacent transversely spaced portions of the magnetic member 137 to define five separate data receiving channels. Although the transducing heads 921–925 are shown in transversely aligned positions, these heads can be disposed in any suitable arrangement. The recorder 136 also includes a drive mechanism controlled by a magnet or solenoid 900 for advancing the magnetic member 137 through a given increment of movement following each recording operation. As described in the above identified Fisher et al. application, this drive mechanism can comprise a sprocket wheel which engages the holes in the magnetic member 137 and which is operated by the release of the solenoid 900.

The transmitter 138 includes five reproducing or magnetic transducing heads 931–935 disposed adjacent the five transversely spaced and longitudinally extending channels in which data is recorded by the transducing heads 921–925. To provide a means for advancing the magnetic member 137 past the heads 931–935, the transmitter 138 includes a drive mechanism of the type described in detail in the above identified Fisher et al. application. This drive mechanism includes a sprocket wheel which engages the sprocket holes in the magnetic member 137 and which is driven by the release of a solenoid 910. The drive mechanism in the transmitter 138 is so positioned relative to the transducing heads 931–935 and 921–925 that the signals recorded on the magnetic member 137 by the heads 921–925 are moved or swept past the gaps in the heads 931–935 when the transmitter drive means is operated. This induces voltages in the windings of the heads 931–935 that are supplied to the five bistable circuits in the transmitting commutator 214. The transmitting commutator 214 and the data receiver 108 connected thereto can comprise circuits and apparatus of the type disclosed and described in detail in the above identified Fisher et al. application.

When data is to be recorded, the receiving commutator 134 and the recorder 136, which can comprise one of a plurality of similar data receiving links, are allotted for use, and the transmitting equipment 102 is prepared for operation. The equipment 102 can be controlled by signals transmitted from a remote sending office or by signals received from a local signal generator, such as a keyboard or record controlled signal transmitter. As shown in FIG. 2, the transmitting equipment 102 is shown as including a relay 110 which is operated to close a pair of contacts 111 when a space signal is received and which is released to open the contacts 111 when a mark signal is received. When the contacts 111 are closed, a more positive potential is applied to the common signaling conductor 462 and, when the contacts 111 are opened, the common signaling conductor 462 is connected to ground through a resistance element 809.

The receiving commutator 134 receives the mark and space information applied to the common signaling conductor 462 in sequential form and operates the recorder 136 to record this information as a parallel entry on the magnetic film 137. In general, the receiving commutator 134 utilizes a counting chain 856 driven by a multivibrator 887 for sequentially rendering each of the five transducing heads 921–925 in the recorder 136 responsive to the signals applied to the incoming line 462 and includes means for rendering the multivibrator 887 effective in response to the recept of a start pulse and ineffective in response to the completion of a single cycle of operation of the counting circuit 856. Further, the termination of the cycle of operation of the counting circuit 856 operates the drive mechanism actuated by the motor magnet 900 to advance the magnetic film or tape 137 a single step following the recording of a complete code combination. In order to permit the plurality of recording heads 921–925 to be rendered effective at a particular point during each of the transmitted code bits, the receiving commutator 134 includes the range selection circuit 106.

The range selection circuit 106, which can comprise any one of a number of suitable circuits well known in the art, such as the circuit shown in United States Patent No. 2,945,093, is controlled by the start or space signal preceding each code combination to provide a time delay between the receipt of the leading edge of the start pulse and the time at which the multivibrator 887 is rendered effective to initiate operation of the counting circuit 856. Thus, the range selector circuit 106 permits the receiving commutator 134 to sample the potential on the common signaling line 462 at any selected point during each of the intervals in which an information bit is transmitted. The range selector circuit 106 is placed in operation when the positive-going leading edge of the space pulse providing the start signal is applied to a coupling capacitor 801. The range selector circuit 106 normally applies a forward bias to a diode 881 to hold the multivibrator 887 in an inoperative condition. After the selected time delay following the receipt of each start signal, the circuit 106 places a reverse bias on the diode 881 to start the multivibrator 887.

To record the incoming coded information, the recorder 136 includes the five transducing heads 921, 922, 923, 924 and 925 that are disposed adjacent transversely spaced portions of the magnetic film or tape 137. One side of the operating winding on each of these heads is connected to the signaling conductor 462, and the other sides of the windings for these heads are each connected to one of a plurality of gaseous discharge tubes 860, 870, 871, 872 and 873 forming the counting chain 856. This counting chain is advanced step-by-step under the control of the multivibrator 887 to momentarily render each of the heads 921–925 effective to record a mark signal on the magnetic film 137 in accordance with the signaling condition on the conductor 462. Space signals are represented by the absence of a recording or magnetized area on the film 137.

The multivibrator 887, which drives the counting chain 856, comprises a pair of cross-coupled transistors 880 and 890 and a drive transistor 985 controlled thereby. In the normal condition of the multivibrator 87, the transistor 890 and the output drive transistor 895 are conducting, and the transistor 880 is held in a nonconductive state by the range selector circuit 106. This circuit normally applies a forward bias to the diode 881 so that current flows through a resistor 875 connected to the base electrode of the transistor 880 to maintain the base of this transistor positive with respect to its emitter electrode.

When the multivibrator 887 is to be placed in operation, the range selector circuit 106 removes the forward bias from the diode 881 so that the potential drop across the resistance element 875 is removed from the base electrode of the transistor 880. This places the base electrode of this transistor at a potential that is negative with respect to the potential of its emitter so that the transistor 880 begins to conduct to provide a voltage drop across a resistor 882 in its collector circuit. In the normal condition of the multivibrator 887, the point of common connection between a coupling condenser 883 and a rectifier 884 is maintained at a slightly negative potential so that, when a drop is produced across the resistor 882, this common point is driven positive to block the rectifier 884. When the rectifier 884 is blocked, the base electrode of the normally conducting transistor 890 goes to approximately ground potential to render the transistor 890 nonconductive. The termination of current flow through the transistor 890 produces a negative voltage swing across a resistor 892 that is coupled through a condenser 891 and a rectifier 893 to the base electrode of the transistor 880, thereby to assist the current buildup therein.

When the rectifier 884 is biased in a reverse direction at the initiation of conduction in the transistor 880, the condenser 883 begins to charge toward a negative voltage determined by a voltage divider including a pair of resistors 885 and 886 over a circuit including a series resistor 889 and the conductive path including the collector of the transistor 880. When this condenser charges sufficiently in a negative direction or disipates the positive swing in voltage provided by rendering the transistor 880 conductive, the rectifier 884 is again biased in a forward direction so that current flows from the voltage divider including the resistors 885 and 886 through the resistors 889 and 876 to provide a negative potential on the base electrode of the transistor 890. During the interval in which the transistor 890 is nonconductive, the coupling condenser 891 charges to a negative potential which maintains the rectifier 893 in a conductive condition. However, when a negative potential is again produced across the resistor 876, the transistor 90 begins to conduct and provides a positive voltage swing that is effective at the junction of the rectifier 893 and the condenser 891 to block the rectifier 893 so that the base electrode of the now conducting transistor 880 goes to approximately ground potential, thereby to render the transistor 880 nonconductive.

The termination of current flow through the transistor 880 produces a negative voltage swing across the resistor 882 which is transmitted through the condenser 883 and the conducting rectifier 884 to the base electrode of the transistor 890, thereby to aid the current buildup in this transistor. In the manner described above, the condenser 891 now begins to charge in a negative direction due to the potential provided by the voltage divider through a resistor 894 so that, after a selected time interval largely determined by the magnitudes of the resistor 894 and the condenser 91, the rectifier 893 is again biased in a forward direction to render the transistor 880 nonconductive. This causes the transistor 890 to conduct. This cyclic operation of the transistors 880 and 990 continues until such time as the range selector circuit 106 applies a forward bias to the diode 881.

To provide a means for deriving an output signal from the multivibrator 887, the transistor 895 is provided. The base electrode of the transistor 895 is normally supplied with the negative potential across the base resistor 876 of the transistor 890 through the normally conductive base-emitter path thereof and a shunting resistance 897. The emitter electrode of the transistor 895 is connected to ground through a low value resistance element 898 so that the base electrode of this transistor is normally negative with respect to its emitter and, accordingly, the transistor 895 is normally conducting. In this conductive state, the emitter of the transistor 895 carries the collector and base current of the transistor 890 and the collector current of the transistor 895. When the transistor 880 is rendered conductive to block the rectifier 884, the base electrodes of the transistor 890 and, by virtue of the resistance 897, of the transistor 895 are biased in a positive direction toward ground. The flow of emitter current in the conductive transistor 880 provides a negative potential drop across the resistor 898 so that the base electrode of the transistor 895 now becomes positive with respect to its emitter electrode, and current flow through the transistor 895 is terminated. The interruption of collector current flow to the emitter of the transistor 895 produces a negatively directed potential swing across a resistor 888.

When the transistor 880 is again rendered nonconductive and the transistor 890 is rendered conductive, as described above, the negative potential across the resistor 876 is applied to the base electrode of the transistor 895 so that this transistor again conducts to provide a positively directed voltage swing at its collector electrode due to the potential drop across the resistor 888. In this manner, an alternating output signal is delivered by the drive transistor 895 to a coupling condenser 896. It should be noted that since the emitter of the transistor 895 carries the current from both of the transistors 890 and 895, a gain is realized in the coupling of the multivibrator 887 to the drive tube 895.

The positive and negative alternations or signals provided by the multivibrator 887 are coupled to a pulse clipping circuit by a capacitor 896. A rectifier 899 which is connected to one terminal of the coupling condenser 896 conducts the negative alternations of the signals to ground so that only the positive-going peaks are applied to a winding 859 which is connected as an autotransformer. The excitation of the winding 859 by the positive-going voltages produces fairly large voltage swings, at the peaks of which ringing is induced. To clip the upper portion of the positive-going signals so as to provide pulses having flat tops, a rectifier 857 is provided. This rectifier is normally biased to around sixty volts by a voltage divider. When the amplitude of the positive pulses provided by the winding 859 exceeds the sixty volt bias, the rectifier 857 conducts to charge a condenser 858, thus removing the peak portions of the positive waves to supply operating pulses of a suitable waveform for operating the counting chain 856.

The pulses from the clipping circuit are applied over a common pulsing lead to the control electrodes of all of the tubes 860, 870, 871, 872 and 873 forming the counting chain 856. Since the first transmitted bit in each code combination is the start pulse which operates the circuit 106, the multivibrator 887 delivers the first operating pulse to the counting chain 856 during the transmission of the first intelligence code bit and at a time determined by the adjustment of the range selector circuit 106. To render the first tube 860 in the counting chain 856 responsive to the first pulse from the multivibrator 887, the control electrode of this tube is provided with a fixed bias from a voltage divider including a pair of resistances 862 and 863 connected between B+ potential and ground. When the first pulse is transmitted through the clipping circuit from the multivibrator 887, the tube 860 is rendered conductive to produce a voltage drop across a pair of cathode resistances 864 and 865. The positive potential provided at the junction of the resistors 864 and 865 is applied through a resistor 866 to the control electrode of the second tube 870 in the counting chain 856.

To provide a means for rendering the first bit recording or transducing head 921 in the recorder 136 responsive to the mark or space pulse potential on the common signaling conductor 462, the positive pulse produced at the cathode of the tube 860 is coupled through a capacitor 867 to one terminal of a gating means or rectifier 859', the other terminal of which is connected to one side of the winding of the head 921. The rectifier 859 is normally biased in a reverse direction by a voltage divider including a pair of resistances 868 and 869 connected between negative battery and ground so that conduction through the head 921 is normally blocked. However, when a positive pulse is supplied by the capacitor 867, the reverse bias for the rectifier 859' is overcome to render the head 921 responsive to the signal applied to the conductor 462. As set forth above, if the transmitted code bit is a space signal, positive battery is connected to the conductor 462. This positive battery is extended through the winding of the transducing head 921 to the rectifier 859'. The application of a positive potential to both of the terminals of the rectifier 859' blocks conduction therethrough and thus prevents a flow of current through the winding of the head 921. Accordingly, when a space signal is transmitted, a signal is not recorded on the magnetic film 137 by the transducing head 921. Alternatively, if the signal transmitted from the remote sending office 102 is a mark pulse, which comprises an open circuit on the conductor 462, the common side of the transducing head 921 is connected to ground through the resistor 809, and the application of the positive potential to the rectifier 859' through the coupling condenser 867 provides a momentary surge of current through the winding of the transducing head 921, thereby to record a mark pulse on the magnetic tape 137.

When the next positive pulse is delivered by the multivibrator 887 to the counting chain 856, the tube 870 is rendered conductive inasmuch as an enabling bias is provided to the control electrode thereof from the cathode circuit of the fired tube 860. Firing the tube 870 provides an enabling bias for the next tube 871 in the counting chain and also provides a positive pulse which is transmitted to the gating means or rectifier in the cathode circuit of the tube 870 to render the head 922 responsive to the signaling condition on the conductor 462. In a similar manner, the tubes 871, 872 and 873 are sequentially rendered conductive to control the recording of mark or space information by the transducing heads 923, 924 and 925.

In addition to controlling the recording of information by the transducing head 925, the firing of the tube 873 couples a positive pulse through a capacitor 846 to the control electrode of a gaseous discharge tube 840. This electrode is provided with a fixed bias by a voltage divider including a pair of resistances 841 and 842 so that the pulse from the counting chain 856 fires the tube 840. The firing of the tube 840 produces a positive signal across a pair of resistors 843 and 844 which is coupled through a condenser 834 to the range selector circuit 106. This positive-going signal advises the circuit 106 that the five information bits in the code combination have been recorded, and the circuit 106 now restores the forward bias to the diode 881 so that the multivibrator or signal generator 887 is stopped.

The control tube 840 also provides a means for energizing the motor magnet 900 in the recorder 136 to advance the magnetic film 137 a single step following the recording of each code combination. More specifically, the cathode of the tube 840 is returned to negative battery through the resistors 843 and 844. In the normally nonconductive condition of the tube 840, the negative battery connected to the resistance 844 together with the negative battery connected to a resistance 852 maintains a power transistor 850 in a conductive condition so that a voltage drop is produced across a ballast lamp 851 in its collector circuit. However, when the tube 840 is rendered conductive, a more positive potential is supplied to the base electrode of the transistor 850 to render this transistor nonconductive, thereby to produce a negative voltage swing at its collector electrode due to the termination of current flow through the ballast lamp 851. This negatively directed voltage swing drives the base electrode of a power transistor 855 negative with respect to its emitter electrode, which is connected to a fixed negative potential, so that the normally nonconductive transistor 855 conducts to operate the motor magnet 900.

The operation of the motor magnet 900 conditions the step-by-step advancing mechanism for moving the magnetic film 137 a single step relative to the heads 921–925 and also opens a pair of contacts 901. The opening of the contacts 901 removes B+ potential from the tubes 840, 860, 870, 871, 872 and 873 so that these tubes are extinguished in preparation for the next cycle of operation of the receiving commutator 134. Extinguishing the tube 840 removes the positive potential from the base electrode of the transistor 850 so that this transistor is rendered conductive to render the transistor 855 nonconductive. This terminates the energization of the motor magnet 900 so that the contacts 901 are closed to again supply B+ potential to the receiving commutator 134. Further, the release of the motor magnet 900 advances the magnetic film 137 a single step so that the code combination which has just been recorded on the film 137 is displaced from the gaps of the transducing heads 921–925.

When the next start pulse is received from the remote sending office 102, the range selector circuit 106 again starts the multivibrator 887 after a time delay that permits the heads 921–925 to sample the voltage on the common signaling line 462 at a selected point during each information bit. The multivibrator 887 now operates the counting chain through an additional single cycle of operation during which the next item of information or code combination is stored on the magnetic film or tape 137 in the recorder 136 by the transducing heads 921–925 in the manner described in detail above.

Although the data processing or recording system has been described in conjunction with an automatic telegraph system, the circuits and operational techniques embodied therein are capable of general application. Accordingly, it should be understood that many other modifications and embodiments can be devised by those skilled in the art that will fall within the spirit and scope of the principles of this invention.

What is claimed as new and desired to be secured by Letters Patent of the United States is:

1. A receiving commutator using a magnetic member, comprising a plurality of transducing heads disposed adjacent said member, each of said heads having a winding, a common signal source for supplying signals to be recorded to said windings, a plurality of electronic devices connected for sequential operation, means responsive to the operation of each of said devices for rendering one of said windings responsive to said signals to be recorded, and drive means operated incident to the seqeuntial operation of said device and cantrolled thereby for advancing said member relative to said heads.

2. The commutator set forth in claim 1 including means controlled by said drive means for conditioning said electronic devices for sequential operation.

3. A receiving commutator for use with a code having N code bits comprising a magnetic medium, a plurality of transducing heads disposed transversely selective to said magnetic medium to define N channels for receiving data, each of said heads having a winding, a signaling conductor connected in common to said windings and adapted to receive signals comprising N code bits, a counting chain including at least N electronic devices coupled to said windings, means for operating said counting chain through a cycle of operation to sequentially render each of said windings responsive to said signals, and means controlled by said counting chain for advancing said medium a single step incident to each of said cycles of operation.

4. A receiving commutator for use with code signals having N code bits preceded by a control signal, said commutator utilizing a magnetic member, comprising N transducing heads disposed transversely relative to said member to define N signal receiving channels on said member, each of said heads having a winding, a signal source for supplying said code signals to all of said windings, N controlled conduction devices connected for sequential operation and individually coupled to said windings, a pulse source for sequentially operating each of said controlled conduction devices to sequentially render said windings responsive to the N code bits of said code signals, control means responsive to said control signals for periodically rendering said pulse source effective to operate said controlled conduction devices, drive means controlled by at least one of said controlled conduction devices for advancing said magnetic member, and means controlled by said drive means for resetting said controlled conduction devices incident to each advance of said magnetic member.

5. The receiving commutator set forth in claim 4 including means controlled by at least one of said controlled conduction devices for operating said control means to render said pulse source ineffective to operate said controlled conduction devices.

6. A receiving commutator using a magnetic member, comprising a plurality of transducing heads disposed adjacent said member, each of said heads having a winding, a first signal source for supplying signals to be recorded to said windings, a plurality of controlled conduction devices connected for sequential operation, a second signal source for operating said controlled conduction devices, means responsive to the operation of each of said devices for rendering a related one of said windings responsive to a signal from said first signal source, drive means for advancing said member relative to said heads, and an additional controlled conduction device connected to one of said plurality of controlled conduction devices for operating said drive means and for rendering said second signal source ineffective to operate said plurality of controlled conduction devices.

7. A commutator apparatus comprising a length of sensible medium, a plurality of data recording heads disposed adjacent transversely spaced portions of said medium, a counting chain of electronic devices operable through a fixed cycle of operation in which each device controls one of said heads, a signaling conductor connected to all of said heads for receiving a series of signals representing an item of information to be recorded, means including said conductor and said counting chain for selectively and sequentially energizing said recording heads to record said item on said medium, and means controlled by said counting chain for advancing said medium a single step incident to said cycle of operation.

References Cited by the Examiner

UNITED STATES PATENTS

| | | | |
|---|---|---|---|
| 2,540,654 | 2/51 | Cohen et al. | 340—174.1 |
| 2,543,874 | 3/51 | Shenk | 328—105 |
| 2,648,589 | 8/53 | Hickman | 179—100.2 |
| 2,698,875 | 1/55 | Greenwood | 340—174.1 |
| 2,833,920 | 5/58 | Buley | 328—106 |
| 2,835,743 | 5/58 | Muffley | 340—174.1 |
| 2,838,675 | 6/58 | Wanlass | 340—174.1 |
| 2,876,058 | 3/59 | Kenosiaw et al. | 346—74 |
| 2,901,549 | 8/59 | Serrell | 346—74 |
| 2,927,304 | 3/60 | Paquin | 340—174.1 |
| 2,986,725 | 5/61 | Dirks | 340—174.1 |

FOREIGN PATENTS

| | | |
|---|---|---|
| 1,010,103 | 6/57 | Germany. |

IRVING L. SRAGOW, *Primary Examiner.*